Patented Jan. 23, 1923.

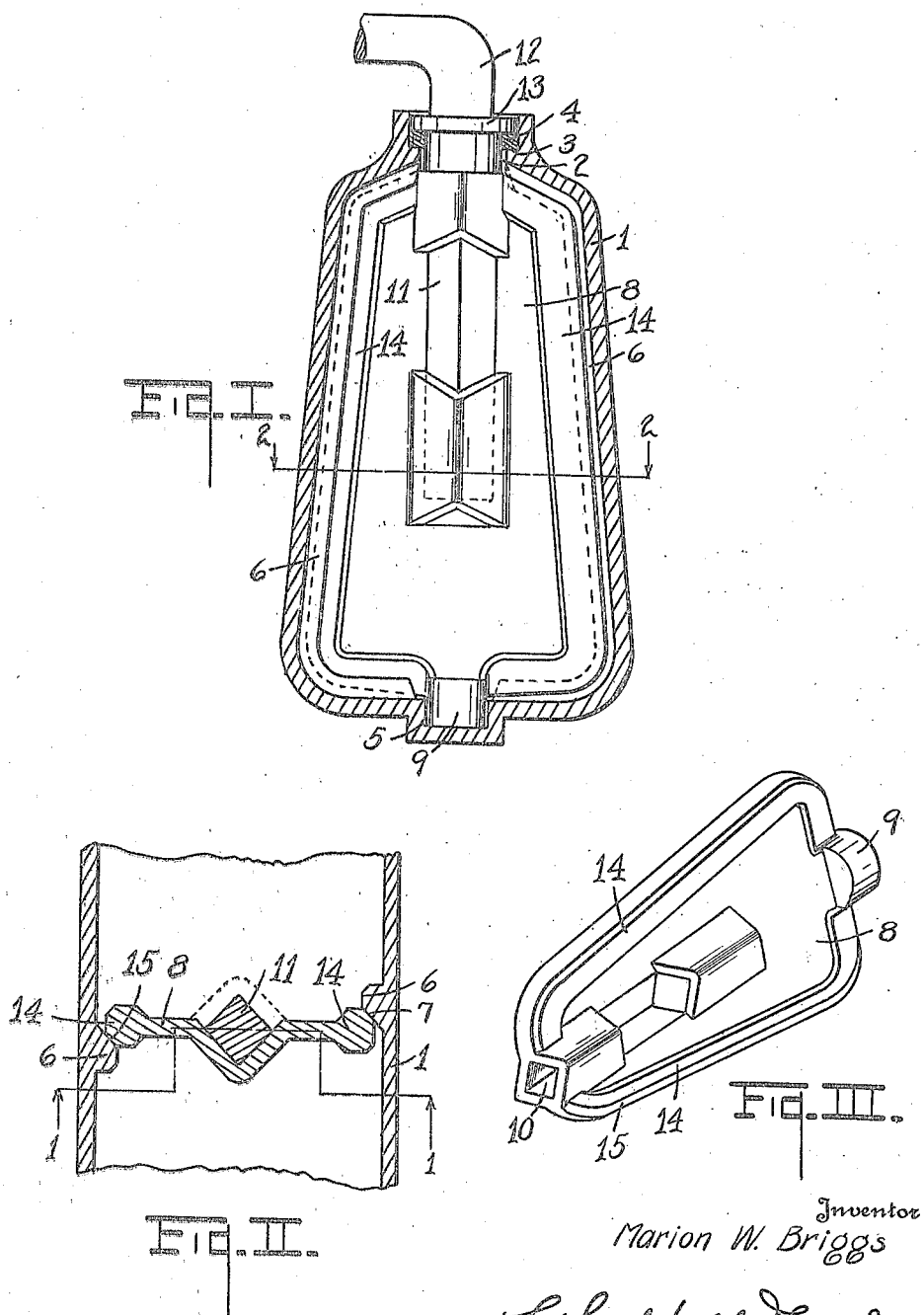

1,443,000

UNITED STATES PATENT OFFICE.

MARION W. BRIGGS, OF MONMOUTH, ILLINOIS.

FURNACE DAMPER.

Application filed August 29, 1922. Serial No. 585,021.

*To all whom it may concern:*

Be it known that I, MARION W. BRIGGS, a citizen of the United States, residing at Monmouth, county of Warren, State of Illinois, have invented certain new and useful Improvements in Furnace Dampers, of which the following is a specification.

This invention relates to improvements in furnace dampers.

The main objects of the invention are:

First, to provide an improved damper for furnace flues which, while closing tightly to prevent the escape or passage of gas, cannot become stuck or wedged.

Second, to provide an improved damper construction which is very durable and not affected by the expansion and contraction or "growth" of the damper and associated flue parts in use.

Third, to provide an improved damper having these advantages which is very simple and economical in its parts.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a vertical section through a furnace flue equipped with my improved damper on a line corresponding to line 1—1 of Fig. II.

Fig. II is a horizontal section on a line corresponding to line 2—2 of Fig. I.

Fig. III is a perspective view of the damper with the spindle removed.

In the drawing similar reference characters refer to similar parts throughout the several views and the sectional views are taken looking in the direction of the section lines.

Referring to the drawing, the flue 1 is provided with a spindle opening 2 at the top surrounded by the shoulder-like gasket seat 3. The gasket 4 arranged in this seat is formed of fiber asbestos or other material not affected by heat. Opposite to this spindle opening is a journal bearing 5 formed in the bottom of the flue.

The rib-like damper seats 6 extend from the spindle opening to the journal bearing and are provided with oppositely facing beveled faces 7. The damper 8 has a journal 9 coacting with the journal bearing 5. It is also provided with a non-circular socket 10 for the non-circular end 11 of the spindle 12. This spindle is arranged through the opening 2 to engage the socket in the damper and is provided with a collar 13 resting upon the gasket 4, thus forming a tight joint. The spindle loosely engaging the damper sockets allows the damper to seat or align itself within the flue to coact with the beveled faces of the faces of the damper seats, the damper having flanges 14 at its edges beveled at 15 to coact with these beveled faces of the damper seats.

With the parts thus arranged I provide a damper which completely seats or closes at its sides, top and bottom and one in which the closing is not affected by the contracting and expanding of the parts or the "growth" or building up of the parts in use. Further, any accumulations of soot or ashes thereon would not interfere with its effective closing.

I have illustrated and described my improvements in an embodiment which I have found very satisfactory in use. I have not attempted to illustrate or describe certain other modification or adaptations which I contemplate as I believe the disclosure made will enable those skilled in the art to which my invention relates to embody or adapt the same as may be desired.

Having thus described my invention, what I claim as new and desire to secure by Letters Patent, is:

1. In a damper, the combination with a flue provided with a spindle opening at the top surrounded by an outwardly facing annular gasket seat and a socket-like journal bearing at its bottom opposite said spindle opening, said flue having internal rib-like damper seats with oppositely facing beveled faces extending from said journal bearing to said spindle opening, a gasket disposed in said gasket seat, a damper provided with flanges at its edges beveled to coact with said damper seats, said damper being provided with a journal at its lower end coacting with said journal bearing and with a longitudinal non-circular spindle socket at its upper end, and a spindle having a non-circular portion loosely engaging said damper socket and provided with a collar resting upon said gasket.

2. In a damper, the combination with a flue provided with a spindle opening at the top surrounded by an outwardly facing annular gasket seat and a socket-like journal bearing at its bottom opposite said spindle opening, a gasket disposed in said gasket seat, a damper provided with a journal at its lower end coacting with said journal bearing and with a longitudinal non-circular spindle coacting at its upper end, and a spindle having a non-circular portion loosely engaging said damper socket and provided with a collar resting upon said gasket.

3. In a damper, the combination with a flue provided with a spindle opening and a socket-like journal bearing opposite said spindle opening, said flue having internal rib-like damper seats with oppositely facing beveled faces, a damper provided with flanges at its edges beveled to coact with said damper seats, said damper being provided with a journal at one end coacting with said journal bearing and with a spindle socket at its other end, and a spindle loosely engaging said damper socket.

4. In a damper, the combination with a flue provided with a spindle opening and having internal rib-like damper seats with oppositely facing beveled faces, a gasket disposed in said opening, a damper provided with flanges at its edges beveled to coact with said damper seats, said damper being provided with a journal at its lower end coacting with said journal bearing and with a spindle socket, and a spindle loosely engaging said damper socket and provided with a collar resting upon said gasket.

5. In a damper, the combination with a flue provided with a spindle opening, a gasket disposed in said opening, a damper, said damper being provided with a journal at its lower end coacting with said journal bearing and with a spindle socket, and a spindle loosely engaging said damper socket and provided with a collar resting upon said gasket.

In witness whereof, I have hereunto set my hand and seal.

MARION W. BRIGGS. [L. S.]